(12) United States Patent
Marleau-Finley

(10) Patent No.: US 12,090,508 B2
(45) Date of Patent: Sep. 17, 2024

(54) INTERNAL SURFACE TREATMENT DEVICE FOR HOLLOW ENGINE SHAFT AND THE LIKE

(71) Applicant: PRATT & WHITNEY CANADA CORP., Longueuil (CA)

(72) Inventor: Julien Marleau-Finley, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 11 days.

(21) Appl. No.: 18/153,404

(22) Filed: Jan. 12, 2023

(65) Prior Publication Data

US 2024/0238832 A1    Jul. 18, 2024

(51) Int. Cl.
| | | |
|---|---|---|
| B05C 7/06 | (2006.01) | |
| B05D 7/22 | (2006.01) | |
| B64D 27/10 | (2006.01) | |
| F02C 7/30 | (2006.01) | |

(52) U.S. Cl.
CPC .................. B05C 7/06 (2013.01); B05D 7/22 (2013.01); B64D 27/10 (2013.01); F02C 7/30 (2013.01); F05D 2230/90 (2013.01); F05D 2240/61 (2013.01)

(58) Field of Classification Search
USPC ......................................................... 118/245
See application file for complete search history.

(56) References Cited

U.S. PATENT DOCUMENTS

| | | | | |
|---|---|---|---|---|
| 947,439 | A * | 1/1910 | Greenfield ............... | B05D 7/22 427/230 |
| 1,455,065 | A * | 5/1923 | Bellows .................... | B05C 7/08 118/DIG. 10 |
| 1,671,374 | A * | 5/1928 | Moore ...................... | B05C 7/08 118/DIG. 10 |
| 1,746,071 | A | 6/1930 | Cotton | |
| 1,787,126 | A * | 12/1930 | Steinnes ................... | B05C 7/08 118/DIG. 10 |
| 1,796,338 | A * | 3/1931 | Mocre ...................... | B05C 7/08 427/230 |
| 2,112,212 | A * | 3/1938 | Purcell ..................... | B05C 7/08 118/DIG. 10 |

(Continued)

FOREIGN PATENT DOCUMENTS

JP            2001239200 A        9/2001

*Primary Examiner* — Jethro M. Pence
(74) *Attorney, Agent, or Firm* — NORTON ROSE FULBRIGHT CANADA LLP

(57) ABSTRACT

A surface treatment device for applying a surface treatment to an inner surface of a hollow engine shaft includes a supply of a surface treatment agent and an elongated rod extending from a proximal end to a distal end. The rod has an inner passage extending from the proximal end to the distal end. The proximal end has an inlet fluidly coupled to the supply. The inner passage terminates at an outlet at the distal end. The rod is insertable inside the shaft. An input device is operable for controlling a delivery of a predetermined quantity of the surface treatment agent from the supply. An applicator disposed at the distal end of the rod adjacent the outlet is engageable with the inner surface of the shaft for applying, upon activation of the input device, the predetermined quantity of the surface treatment agent to the inner surface of the shaft.

17 Claims, 5 Drawing Sheets

(56) References Cited

U.S. PATENT DOCUMENTS

| | | | | |
|---|---|---|---|---|
| 2,158,579 A * | 5/1939 | Hodgkins | ............... | B05C 7/08 |
| | | | | 118/259 |
| 2,445,645 A * | 7/1948 | Stephens | ............... | B05C 7/08 |
| | | | | 118/DIG. 10 |
| 2,480,358 A * | 8/1949 | Curtis | ............... | B05C 7/08 |
| | | | | 118/DIG. 10 |
| 3,007,810 A | 11/1961 | Hobrock | | |
| 3,111,431 A | 11/1963 | Weaver | | |
| 3,112,227 A * | 11/1963 | Curtis | ............... | B05C 7/08 |
| | | | | 15/104.095 |
| 3,117,026 A * | 1/1964 | Spier | ............... | B05C 7/06 |
| | | | | 15/104.095 |
| 3,118,791 A * | 1/1964 | McLean | ............... | B05C 7/08 |
| | | | | 118/503 |
| 3,211,573 A * | 10/1965 | Hight | ............... | B05D 7/222 |
| | | | | 118/DIG. 13 |
| 3,280,845 A * | 10/1966 | Eskijian | ............... | B05C 7/08 |
| | | | | 29/460 |
| 3,885,521 A | 5/1975 | von Arx | | |
| 3,946,125 A * | 3/1976 | Scheiber | ............... | B05D 7/22 |
| | | | | 118/317 |
| 4,031,605 A * | 6/1977 | Couch | ............... | B05D 7/22 |
| | | | | 264/254 |
| 4,084,781 A * | 4/1978 | Couch | ............... | B05D 7/22 |
| | | | | 249/83 |
| 4,158,071 A * | 6/1979 | Jordan | ............... | B05B 5/12 |
| | | | | 427/232 |
| 4,184,830 A * | 1/1980 | Perkins | ............... | B28B 19/0023 |
| | | | | 425/469 |
| 4,774,905 A * | 10/1988 | Nobis | ............... | F16L 55/1645 |
| | | | | 427/236 |
| 5,066,518 A * | 11/1991 | Klingen | ............... | B05D 7/22 |
| | | | | 427/236 |
| 5,141,774 A * | 8/1992 | Prittinen | ............... | B05B 3/1064 |
| | | | | 427/236 |
| 6,228,169 B1 * | 5/2001 | Wallace | ............... | B05D 7/14 |
| | | | | 411/908 |
| 6,309,693 B1 * | 10/2001 | Wallace | ............... | B05B 13/0636 |
| | | | | 427/195 |
| 6,474,919 B2 * | 11/2002 | Wallace | ............... | B05D 7/14 |
| | | | | 411/301 |
| 7,556,689 B2 * | 7/2009 | Lee | ............... | F28D 15/0275 |
| | | | | 222/401 |
| 9,108,205 B2 * | 8/2015 | Bottger | ............... | B05B 7/0458 |
| 9,586,218 B2 * | 3/2017 | Bottger | ............... | B05B 13/06 |
| 9,616,449 B2 * | 4/2017 | Harmat | ............... | B05D 7/22 |
| 10,118,187 B1 * | 11/2018 | Monaghan | ............... | B05B 13/0636 |
| 10,399,118 B2 * | 9/2019 | Harmat | ............... | B05B 13/0645 |
| 10,520,265 B2 * | 12/2019 | Kwark | ............... | B05D 7/222 |
| 10,677,031 B2 * | 6/2020 | Xiao | ............... | F04B 23/04 |
| 10,828,661 B2 | 11/2020 | Lokkinen | | |
| 2006/0117799 A1 * | 6/2006 | Miyahara | ............... | C03C 17/30 |
| | | | | 360/98.08 |
| 2019/0054496 A1 * | 2/2019 | Lokkinen | ............... | A46D 1/0238 |

\* cited by examiner

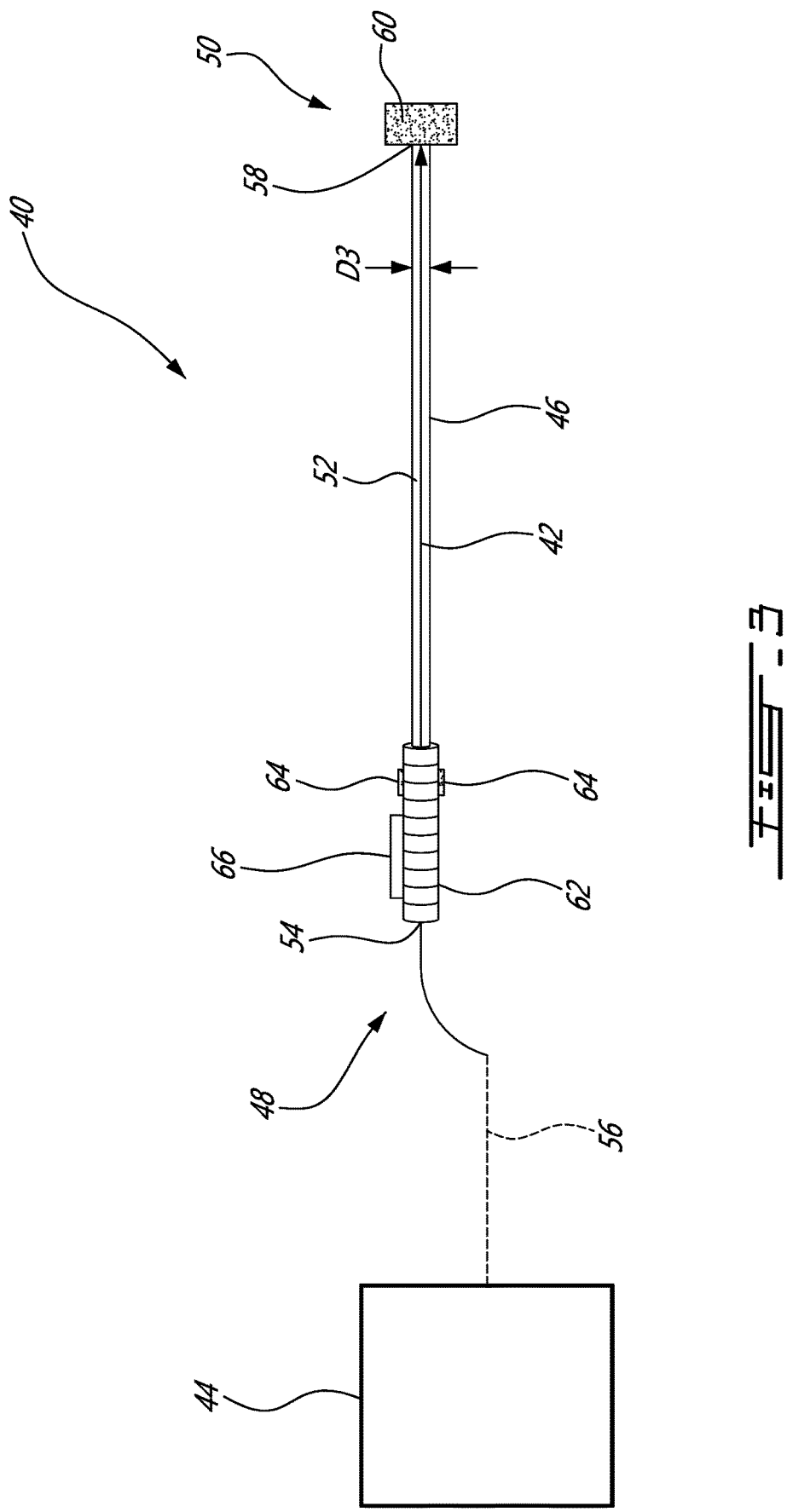

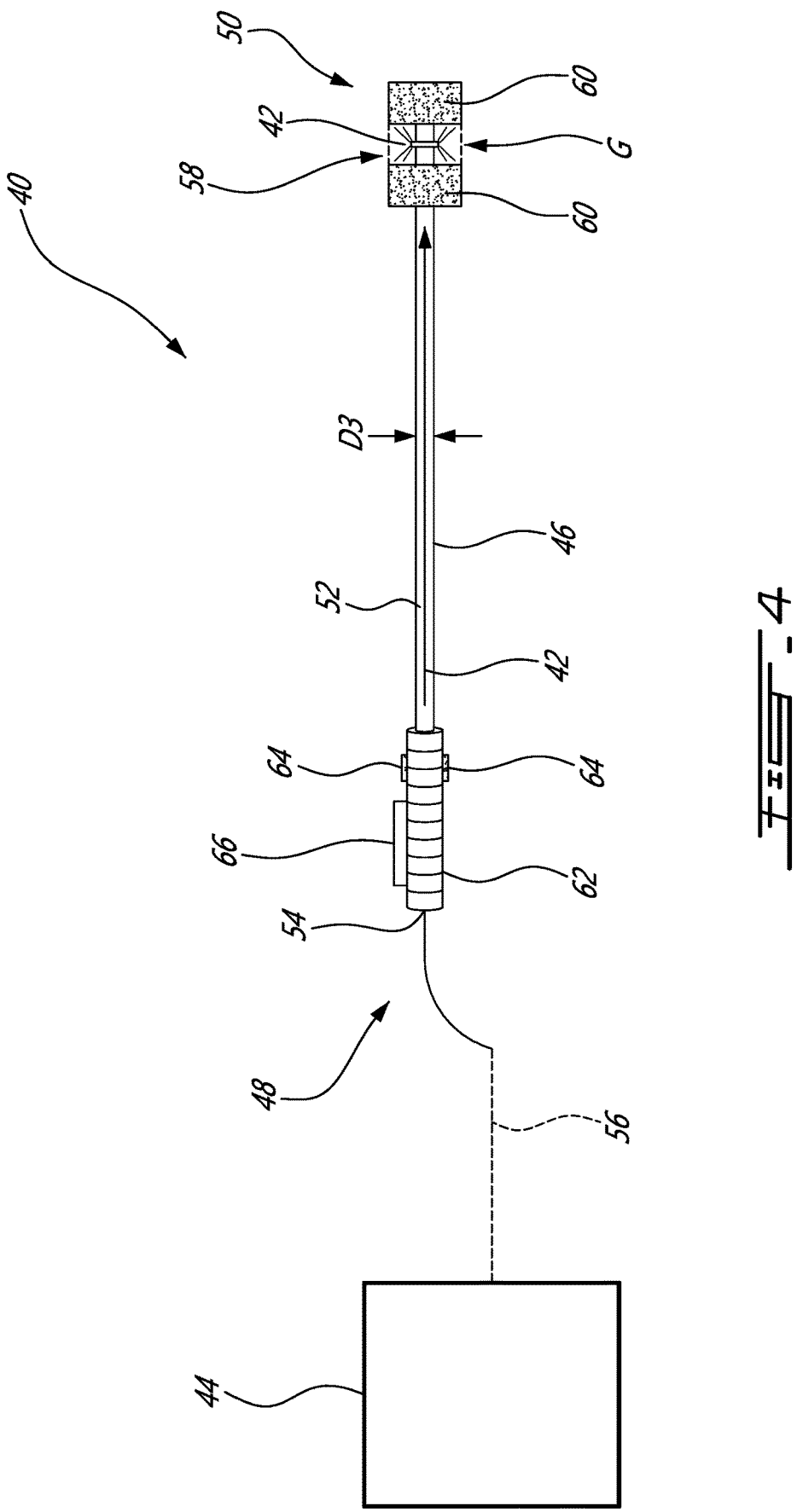

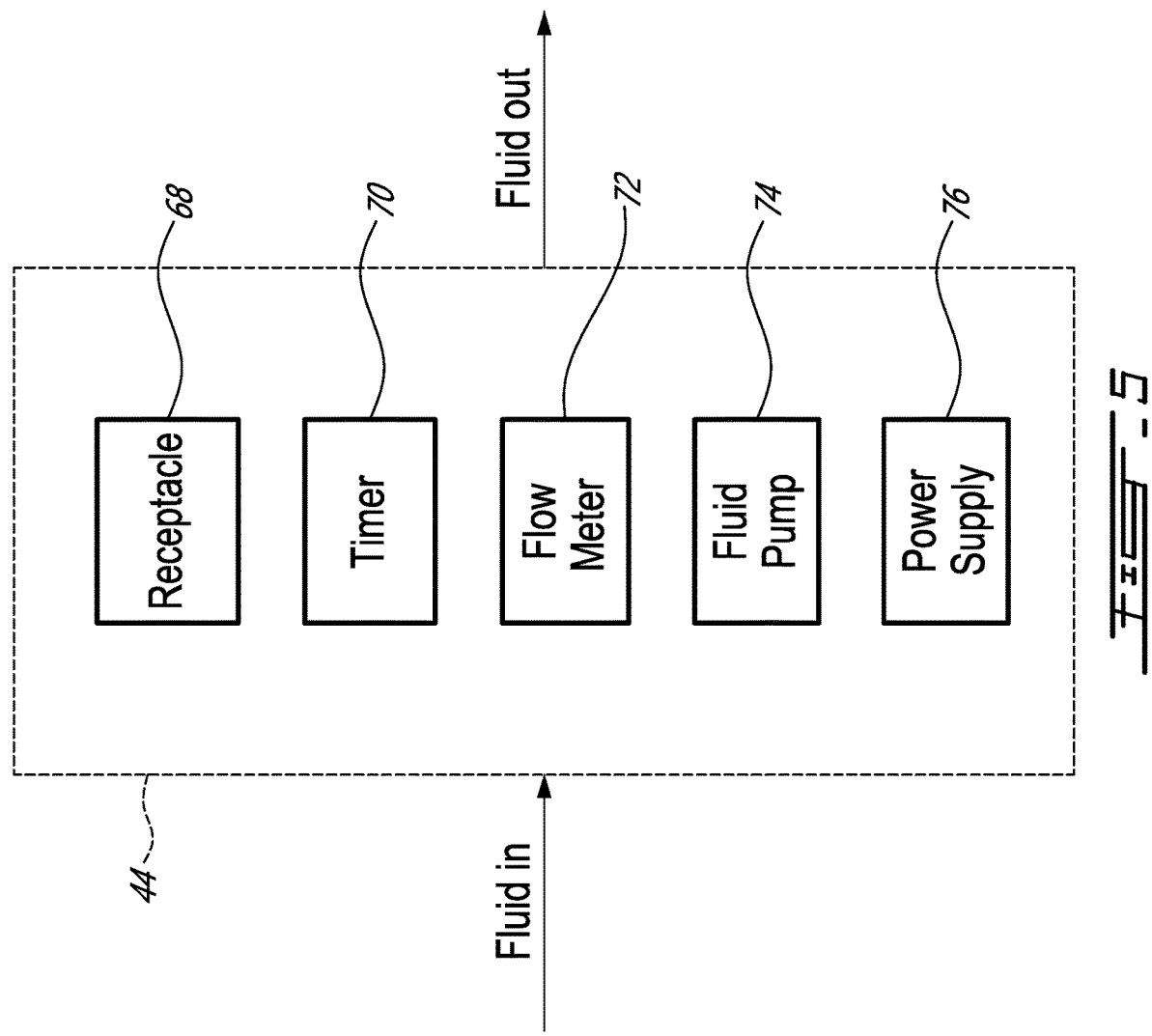

INTERNAL SURFACE TREATMENT DEVICE FOR HOLLOW ENGINE SHAFT AND THE LIKE

TECHNICAL FIELD

The disclosure relates to a device and a method for applying a surface treatment, such as paint, to the inner surface of hollow engine shafts and the like.

BACKGROUND

Hollow shafts used for aircraft engines and the like may be coated. For instance, these shafts may be painted to prevent corrosion. Due to their size, access to the inner surface of these shafts may be limited, and known techniques for protecting the outer shaft surfaces, for instance via paint guns, may not be suitable.

SUMMARY

In one aspect, there is provided a surface treatment device for applying a surface treatment to an inner surface of a hollow engine shaft, comprising a supply of a surface treatment agent, an elongated rod extending from a proximal end to a distal end, the elongated rod having an inner passage extending from the proximal end to the distal end, the proximal end having an inlet fluidly coupled to the supply of the surface treatment agent, the inner passage terminating at an outlet at the distal end, the elongated rod insertable inside the hollow engine shaft, an input device operable for controlling a delivery of a predetermined quantity of the surface treatment agent from the supply of the surface treatment agent, and an applicator disposed at the distal end of the elongated rod adjacent the outlet, the applicator engageable with the inner surface of the hollow engine shaft for applying, upon activation of the input device, the predetermined quantity of the surface treatment agent from the supply of the surface treatment agent to the inner surface of the hollow engine shaft.

In another aspect, there is provided a coating rod for applying a predetermined quantity of a coating liquid to an inner surface of a hollow engine shaft, comprising an elongated body extending longitudinally from a first end to a second end, the elongated body sized and configured for axial insertion inside the hollow engine shaft, an inner passage extending longitudinally through the elongated body, the inner passage having a coating inlet at the first end and a coating outlet at the second end, an input device for activating a delivery of the predetermined quantity of the coating liquid, and a coating applicator disposed at the second end adjacent the coating outlet.

In a further aspect, there is provided a method for treating an inner surface of a hollow engine shaft, comprising engaging an elongated rod inside the hollow engine shaft, the elongated rod having a distal end carrying an applicator, directing a predetermined quantity of a surface treatment agent through an inner passage of the elongated rod towards the distal end, releasing the predetermined quantity of the surface treatment agent from an outlet of the inner passage of the elongated rod inside the hollow engine shaft, and spreading the predetermined quantity of the surface treatment agent along the inner surface of the hollow engine shaft with the applicator.

BRIEF DESCRIPTION OF THE DRAWINGS

Reference is now made to the accompanying figures in which:

FIG. 3 is a schematic cross sectional view of a surface treatment device according to an embodiment of the present disclosure;

FIG. 4 is a schematic cross sectional view of a surface treatment device according to another embodiment of the present disclosure; and FIG. 5 is a block diagram of an example surface treatment supply, according to an embodiment of the present disclosure.

DETAILED DESCRIPTION

Figure 1:
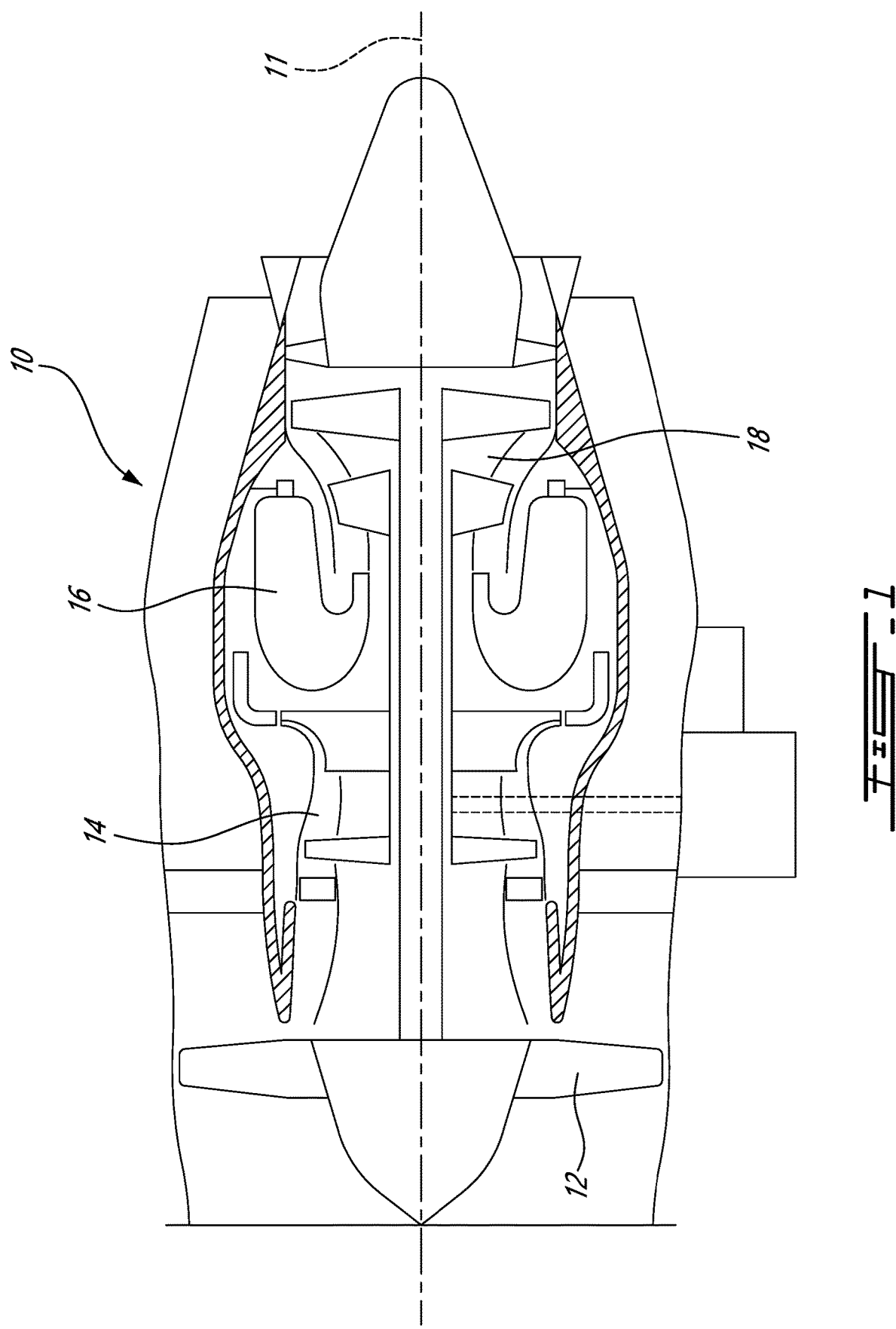
FIG. 1 is a schematic cross sectional view of a gas turbine engine.

FIG. 1 illustrates a gas turbine engine 10 of a type preferably provided for use in subsonic flight, generally comprising in serial flow communication, along central longitudinal axis 11, a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. While the depicted engine 10 is a turbofan engine, the present disclosure is applicable to other types of engines, such as turbojet, turboprop, and turboshaft engines, as well as hybrid-electric engines.

Figure 2:
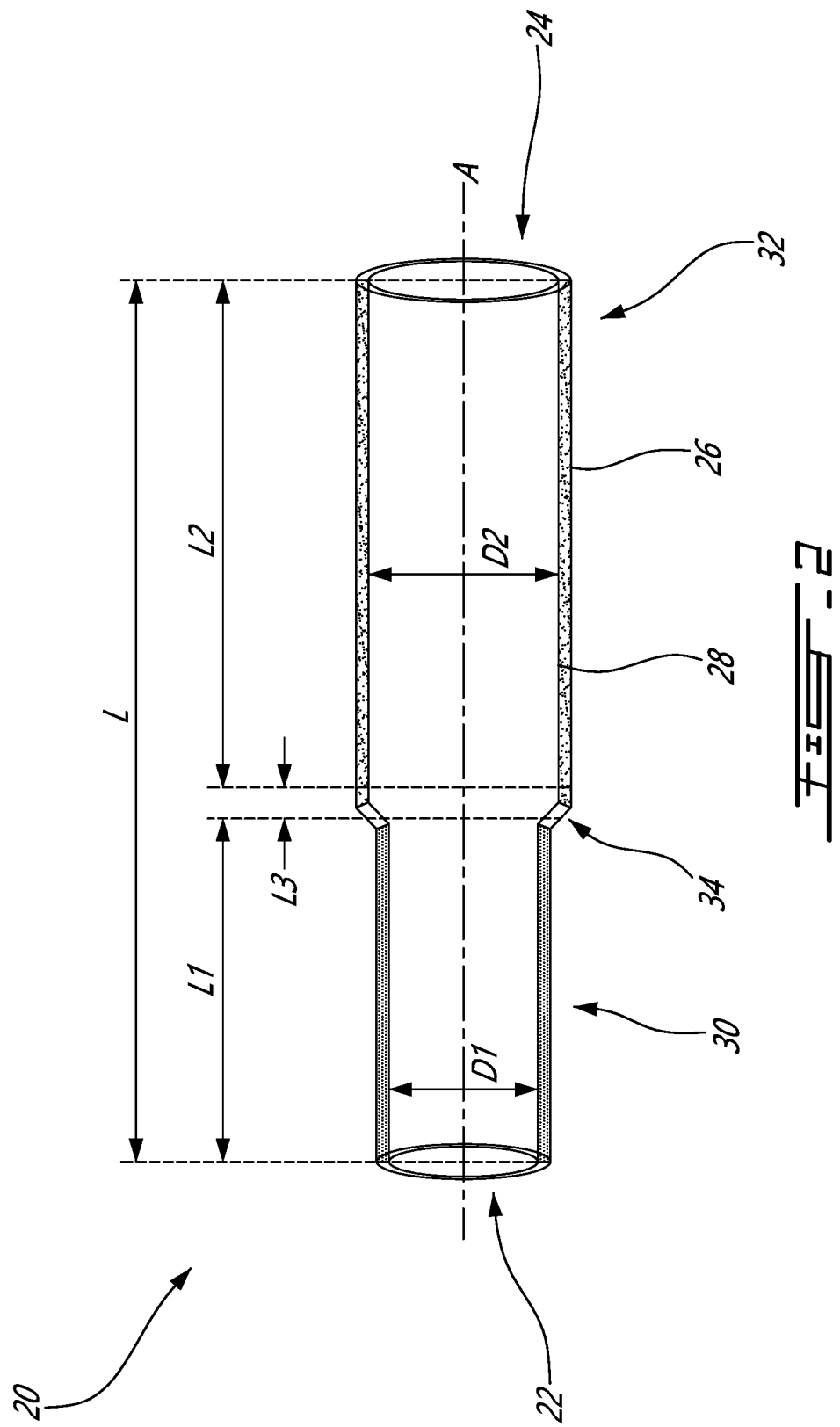
FIG. 2 is a schematic cross sectional view of an exemplary shaft for the engine of FIG. 1.

Referring to FIG. 2, an exemplary hollow shaft 20 used in the engine 10 is shown. Shaft 20 may be, for instance, a main shaft for the engine 10, a power turbine shaft for the turbine section 18, or a low pressure shaft drivingly coupling a low pressure compressor of the compressor section 14 to a low pressure turbine of the turbine section 18. Other hollow shafts of the engine 10 may be contemplated. The shaft 20 may be made from steel or other like materials. Other materials may be contemplated as well. The shaft 20 extends along a shaft longitudinal axis A from a first end 22 to a second end 24. The shaft 20 has a hollow cylindrical body with an outer surface 26 and an inner surface 28 radially disposed within the outer surface 26.

In the shown case, the shaft 20 is made up of two sections having inner surfaces 28 with different inner diameters: a first section 30 of axial length L1 having a first inner diameter D1, and a second section 32 of axial length L2 having a second inner diameter D2 for its inner surface 28. A transition portion 34 of axial length L3, for instance a tapered or frustoconical portion, joins the first section 30 to the second section 32. An overall axial length L of the shaft 20 may include the first section axial length L1, the second section axial length L2, and the transition portion axial length L3. In the shown case, the second inner diameter D2 is greater in magnitude than the first inner diameter D1, although the opposite arrangement may be contemplated. Similarly, in the shown case, the second section axial length L2 is greater in magnitude than the first section axial length L1, although the opposite may be contemplated.

Various combinations of diameters and lengths for each section 30, 32 may be contemplated. While the shown shaft 20 includes two main sections 30, 32, the present disclosure is applicable to shafts 20 with other numbers of sections having different inner diameters, for instance three or more sections of different axial lengths and inner diameters. Similarly, the present disclosure is applicable to a shaft 20 having a constant inner diameter along its axial length (i.e., a single section shaft). In some cases, the shaft 20 may have an axial length L ranging from 20 to 80 inches long, with an inner diameter ranging from 0.360 to 1.400 inches. Other shaft lengths and diameters may be contemplated.

Referring additionally to FIG. 3, a surface treatment device 40 is shown for applying a surface treatment agent 42 (e.g., paint/liquid coating) stored in a surface treatment supply 44 to an inner surface 28 of a shaft 20, for instance the shaft 20 of FIG. 2, according to one or more embodiments of the present disclosure. Still according to one or more embodiments, the surface treatment agent 42 may be paint, with the surface treatment device 40 operable to apply a uniform layer or coating of paint to the inner surface 28 of the shaft 20 to protect the inner surface 28 of the shaft from corrosion. Other surface treatment agents 42 may be contemplated, for instance protective liquid coatings, such as a rust-proofing coating.

The surface treatment device 40 depicted in FIG. 3 includes an elongated rod 46, also referred to as a coating rod, having an elongated body of diameter D3 extending longitudinally from a proximal end 48 (also referred to as a first end) to a distal end 50 (also referred to as a second end), with an inner passage 52 extending longitudinally centrally through the elongated rod 46 from the proximal end 48 to the distal end 50. At the proximal end 48, there is an inlet 54 (also referred to as a coating inlet) to the inner passage 52 fluidly coupled to the surface treatment supply 44, illustratively via a flexible conduit or hose 56. At the distal end 50, the inner passage 52 terminates at an outlet 58 (also referred to as a coating outlet). Various outlet types may be contemplated, as will be discussed in further detail below. The surface treatment agent 42 (e.g., the paint or liquid coating substance) is shown as flowing through the inner passage 52, defining a general surface treatment flow direction from the proximal end 48 to the distal end 50.

An applicator 60 (also referred to as a coating applicator) is disposed at the distal end 50 adjacent the outlet 58. In the embodiment shown in FIG. 3, the applicator is directly fluidly coupled to the outlet 58 and is thus configured for receiving the surface treatment agent 42 directly therefrom. Stated differently, the inner passage 52 terminates, at the distal end 50, directly at the applicator 60 such that the surface treatment 42 from the surface treatment supply 44 is supplied, via the inner passage 52, directly to the applicator 60. As such, the surface treatment device 40 is operable for coating the inner surface 28 of the exemplified engine shaft 20 by supplying the surface treatment agent 42, from the supply 44, through the inner passage 52 of the elongated rod 46 to the applicator 60 at the distal end 50 thereof, via the outlet 58, to apply the surface treatment agent 42 to the inner surface 28. The rod diameter D3 may be sized to be smaller in magnitude than the smallest of the hollow shaft 20 interior diameters, illustratively D1 in the shaft 20 shown in FIG. 2, so that the elongated rod 46 may be easily inserted into the hollow shaft 20 along shaft axis A.

The elongated rod 46 may be made from, for instance, steel, aluminum, or a hard plastic. Other materials may be contemplated as well. In the shown case, the device 40 includes a handle 62 at the proximal end 48 with an input device 64 such as one or more control buttons 64 (e.g., push-button or trigger) for controlling the delivery of the surface treatment agent 42 from the surface treatment supply 44 to the applicator 60. Various delivery means from the supply 44 to the elongated rod 46 may be contemplated, as will be discussed in further detail below. A visual indicator 66, for instance a light or a screen, may provide or present a status of the provision of surface treatment agent 42, as will be discussed in further detail below.

As will be discussed in further detail below, the surface treatment device 40 is operable to deliver a predetermined quantity or volume of the surface treatment agent 42 from the surface treatment supply 44 to the inner surface 28 of the hollow engine shaft 20. The applicator 60 may thus apply a consistent layer of surface treatment agent 42 (e.g., a consistent paint or coating thickness) along the axial length L of the shaft 20, as the quantity of surface treatment agent 42 required for this application may be predetermined and metered. Various predetermination and metering means may be contemplated, as will be discussed in further detail below. As such, the uniformity of a painting/coating process for a given shaft 20, as well as the repeatability of a painting/coating process for different shaft sections 30, 32 or for multiple shafts 20, may be improved. For instance, a thickness of the coating liquid, for instance paint, may be consistent along the axial length L of the shaft 20 (i.e., minimal variation of the thickness along the axial length L). In some cases, the desired coating thickness may range from 0.015 to 0025 inches. Other coating thicknesses may be contemplated, for instance based on the material of the shaft 20 and the type of liquid coating applied as the surface treatment agent 42.

In the embodiment shown in FIG. 3, the surface treatment device 40 includes a single applicator 60 mounted to the distal end 50 of the elongated rod 46, although the number of applicators 60 may vary. In the shown case, the applicator 60 is a sponge, i.e., an applicator 60 able to expand and contract based on its surroundings. Other applicators 60 may be contemplated, for instance a brush. The porosity of the sponge may vary, for instance based on a desired final paint texture on the inner surface 28. The sponge may be sized to span a greater diameter than the greatest inner diameter of the hollow shaft 20 (illustratively D2 of the hollow shaft 20 of FIG. 2) and be compressible to easily slide within the section of the hollow shaft 20 having the smallest inner diameter (illustratively D1 of the hollow shaft 20 of FIG. 2). As such, the wet or saturated sponge may apply the surface treatment agent 42 in all directions to the inner surface 28, providing a consistent application of the surface treatment agent 42. Such application may be accomplished, for instance, via a reciprocating motion of the elongated rod 46 along the shaft axis A, with metered quantities surface treatment agent 42 being provided to the applicator 60 (e.g., to the compressed sponge) for a specific inner surface 28 (or section of an inner surface 28), with the provision of additional surface treatment agent 42 available as needed.

Referring to FIG. 4, another embodiment of a surface treatment device 40 for applying a surface treatment agent 42 stored in a surface treatment supply 44 to the inner surface 28 of the shaft 20 is shown, with like reference numerals referring to like elements. In this embodiment, the outlet 58 includes a plurality of nozzles 58. In the shown case, two applicators 60 are disposed at the distal end 50 of the elongated rod 46, one in front of the other, with an axial gap G disposed therebetween. Nozzles 58, illustratively four nozzles 58, are disposed in the axial gap G and are aimed towards the applicators 60. Other numbers of applicators 60 and nozzles 58 may be contemplated. In the shown case, the nozzles 58 are aimed directly at the applicators 60. The nozzles 58 are therefore operable to deliver a metered quantity of surface treatment agent 42, such as paint and liquid coating, directly to the applicator 60 (i.e., to wet or saturate the applicator 60) so that the applicator 60 may be used to coat the inner surface 28 of the shaft 20. In other cases, the nozzle(s) 58 may be aimed radially outwardly, i.e. towards the inner surface 28 of the shaft 20 directly. In such cases, the applicators 60 may be used to spread the surface treatment agent 42 that is sprayed onto the inner surface 28 by the nozzle(s) 58. Other numbers and directions of nozzles 58 may be contemplated, for instance nozzles 58 operable to spray coating liquid in both upstream and downstream directions. As such, an axial width of the gap G may vary.

The coating device 40 of FIG. 4 is therefore operable to coat/paint the inner surface 28 of the shaft 20 via two distinct applicators 60. This may increase the surface area of the inner surface 28 that may be coated in each stroke of the elongated rod 46. Other numbers of applicators 60 and nozzles 58 may be contemplated. For instance, one larger (i.e., occupying a larger axial length along the elongated rod 46) applicator 60 may be disposed towards the distal end 50 of the elongated rod 46, with one or more nozzles 58 disposed on the elongated rod 46 on both upstream and downstream sides of the applicator 60. In other cases, the one or more nozzles 58 may be aimed radially outwardly, i.e. towards the inner surface 28 of the shaft 20 directly. In such cases, the applicators 60 may be used to spread the surface treatment agent 42 that is sprayed onto the inner surface 28 by the nozzle(s) 58. Various nozzle types may be contemplated, for instance a flat fan distribution nozzle, a conical distribution nozzle, or a single point distribution nozzle.

Various combinations of the surface treatment devices 40 shown in FIGS. 3 and 4 may be contemplated. For instance, the number of applicators 60 and the outlet 58 type may vary. For instance, while FIG. 3 shows a surface treatment device 40 having a single applicator 60 directly fluidly coupled to the outlet 58, in other cases the surface treatment device 40 may include two applicators 60 axially spaced apart at the distal end 50 and each directly fluidly coupled to outlets 58 of the inner passage 52. Likewise, while FIG. 4 shows a surface treatment device 40 having two applicators 60 axially spaced apart with a plurality of nozzles 58 disposed in an axial gap G therebetween, in other cases the surface treatment device 40 may include a single applicator 60 disposed at the distal end 50 with one or more nozzles 58 disposed upstream or downstream of the applicator 60. Other such combinations may be contemplated.

Referring to FIG. 5, an exemplary block diagram for the surface treatment supply 44 is shown. The surface treatment agent 42 may be stored in a receptacle 68. Various filling means (represented in FIG. 5 by "Fluid in") may be contemplated, for instance manually filling the receptacle 68 as needed or an automatic delivery system of surface treatment agent 42 by another source (not shown). Surface treatment agent 42 may exit the receptacle 68 (represented in FIG. 5 by "Fluid out") via the conduit 56 of FIGS. 3 and 4. As discussed above, various tubes or conduits may be contemplated. A timer 70 and flow meter 72 may be provided for controlling or metering the quantity or volume of surface treatment agent 42 to be delivered to the applicator 60. A fluid pump 74 may be provided to deliver the surface treatment agent 42 to the applicator 60, as will be discussed in further detail below. A power supply 76 may provide power for the timer 70, flow meter 72 and/or fluid pump 74. The power supply 76 may be an on-board power supply (e.g., a battery) or may be the main electric grid. In some cases, different components of the surface treatment supply 44 may receive power from different sources. While the timer 70 is illustratively shown to be included in the surface treatment supply 44, in other cases it may be integrated directly in the handle 62.

As discussed above, the surface treatment supply 44 is operable to deliver a predetermined or metered quantity of surface treatment agent 42 to the applicator 60. Various means for this predetermination and metering may be contemplated. For instance, a correlation between a desired or required thickness of the surface treatment agent 42 applied to the inner surface 28 and a quantity or volume of surface treatment agent 42 may be determined by taking into account the above-mentioned desired or required thickness, an axial length of the section of the shaft 20 to which the surface treatment agent 42 is to be applied, and an inner diameter of this section of the shaft 20. This predetermined quantity may be referred to as a minimum or baseline quantity of surface treatment agent 42 required, as multiple iterations of surface treatment processes may be required to determine an actual required quantity, which may be higher than the predetermined quantity.

To deliver the predetermined quantity of surface treatment agent 42 to the applicator, a user may engage the input device 64 to begin a delivery procedure, the input device 64 operatively coupled to the surface treatment supply 44. Upon engaging the input device (e.g., pressing a button 64 on the handle 62), the fluid pump 74 may engage and operate until a signal is received from the timer 70 and/or the flow meter 72 indicative of the predetermined quantity of surface treatment agent 42 being evacuated from receptacle 68. For instance, the flow meter 72 may be disposed between the receptacle 68 and the elongated rod 46 and make this determination based on the flow rate of the surface treatment agent 42 exiting the receptacle 68 and an elapsed period of time (e.g., based on the timer 70). In other cases, if a flow rate of the fluid pump 74 is known, a period of time required to deliver the predetermined quantity of surface treatment agent 42 may be similarly predetermined, and the timer 70 may thus send a signal to cease delivery of surface treatment agent once this period of time has elapsed. Other metering and predetermining means may be contemplated.

Various numbers and types of input devices 64 may be contemplated. The surface treatment devices 40 shown in FIGS. 3 and 4 illustratively include two buttons 64 mounted to the handle 62. Each button 64 may, for instance, be operable to control a metered quantity of surface treatment agent 42 to a specific section of the hollow engine shaft 20. Stated differently, each button 64 may engage a new countdown from one or more timers 70. For instance, as discussed above, the exemplary hollow engine shaft 20 as shown in FIG. 2 includes two sections 30, 32, with the first section having an inner diameter D1 and axial length L1 that are each inferior to an inner diameter D2 and axial length L2 of the second section 32. An inner surface area of the second section 32, and thus an area to be treated with surface treatment agent 42, is therefore of greater magnitude than an similar area to be treated of the first section 30. As such, if the inner surface 28 is to have a same thickness of surface treatment agent 42 applied thereto, a greater quantity (or portion) of surface treatment agent 42 is to be delivered to the applicator 60 for spreading the surface treatment agent 42 to the second section 32 than the portion or quantity of surface treatment agent 42 delivered to the first section 30. More generally, each button 64 may be operable to deliver a predetermined quantity of surface treatment to the applicator 60 corresponding to a particular section of the hollow engine shaft 20 to have its inner surface 28 treated. These same buttons 64, or additional buttons, may have additional functions for manual override of the delivery of surface treatment agent 42, for instance to cease a delivery procedure midway, or to provide additional surface treatment agent 42 when required. The buttons 64 may be, for instance, switches, toggles, levers, or capacitive buttons, among others. Other input devices may be contemplated. The buttons 64 may thus be programmable based on the dimensions and intended surface treatment agent thickness for a given shaft 20.

A visual indicator 66 may also be provided. The visual indicator 66 may be one or more lights or a display screen. The visual indicator 66 may be operable to display a status of a delivery procedure of surface treatment agent 42, for instance by displaying different message or light patterns/sequences based on an ongoing procedure, a "ready" status for a next procedure, or an "error" status indicative of an inability for the surface treatment agent 42 to be delivered. In the case of a display screen, text may be displayed to indicate, for instance, a type of error (e.g., a lack of surface treatment agent 42 in the receptacle). In some cases, an auditory indicator may additionally or alternatively be provided and be operable to signal various events of a delivery procedure of surface treatment agent 42. The visual indicator 66 and/or auditory indicator may be operatively coupled to the timer 70, for instance to alert a user of a remaining time period for a given delivery procedure of surface treatment agent 42. In some cases, the timer 70 (or an additional timer) may be integrated into the handle 62.

Various fluid pumps 74 may be contemplated. For instance, an electric fluid pump 74, receiving power from the power supply 76. may be operable to displace the surface treatment agent 42 from the receptacle 68 to the applicator 60, with its activation controlled by the input device 64, timer 70 and/or flow meter 72. In other cases, the receptacle 68 may include a main receptacle storing a main supply of surface treatment agent 42 and a smaller receptacle that may be filled with the predetermined quantity of surface treatment agent 42 to be displaced towards the applicator 60. In such cases, the fluid pump 74, when activated, may displace the entire quantity of surface treatment agent 42 from the smaller receptacle 68 in order to deliver the predetermined quantity of surface treatment agent 42 to the applicator 60. In such cases, an automatic fluid pump 74 may be used (e.g., an electric fluid pump 74). Alternatively, a manual fluid pump 74 may be used, for instance a syringe-like device or a foot-activated pump for evacuating the surface treatment agent 42 from the smaller receptacle. Other fluid pump types and delivery means may be contemplated.

According to the present disclosure, there is taught an exemplary method for treating an inner surface 28 of a hollow engine shaft 20 of an aircraft engine 10. An elongated rod 46 is engaged inside the hollow engine shaft 20, the elongated rod 46 having a distal end 50 carrying an applicator 60. A predetermined quantity of a surface treatment agent 42 is directed through an inner passage 52 of the elongated rod 46 towards the distal end 50. The predetermined quantity of the surface treatment agent 42 is released from an outlet 58 of the inner passage 52 of the elongated rod 46 inside the hollow engine shaft 20. The predetermined quantity of the surface treatment agent 42 is spread along the inner surface 28 of the hollow engine shaft 20 with the applicator 60.

It can be appreciated that at least some embodiments have a surface treatment device with an elongated rod having an inner passage passing therethrough to deliver a predetermined quantity of a coating liquid to an applicator at a distal end thereof, thereby allowing for improved uniformity and repeatability in applying coating liquids/paint to the inner surfaces of hollow engine shafts.

In the present disclosure, when a specific numerical value is provided (e.g. as a maximum, minimum or range of values), it is to be understood that this value or these ranges of values may be varied, for example due to applicable manufacturing tolerances, material selection, etc. As such, any maximum value, minimum value and/or ranges of values provided herein (such as, for example only, the shaft having an axial length ranging from 20 to 80 inches), include(s) all values falling within the applicable manufacturing tolerances. Accordingly, in certain instances, these values may be varied by ±5%. In other implementations, these values may vary by as much as ±10%. A person of ordinary skill in the art will understand that such variances in the values provided herein may be possible without departing from the intended scope of the present disclosure, and will appreciate for example that the values may be influenced by the particular manufacturing methods and materials used to implement the claimed technology.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A surface treatment device for applying a surface treatment to an inner surface of a hollow engine shaft, comprising:
   a supply of a surface treatment agent;
   an elongated rod extending from a proximal end to a distal end, the elongated rod having an inner passage extending from the proximal end to the distal end, the proximal end having an inlet fluidly coupled to the supply of the surface treatment agent, the inner passage terminating at an outlet at the distal end, the elongated rod insertable inside the hollow engine shaft, the elongated rod having a handle at the proximal end for allowing an operator to handle the elongated rod;
   an input device operable for controlling a delivery of a predetermined quantity of the surface treatment agent from the supply of the surface treatment agent, the input device comprising one or more control buttons integrated to the handle for allowing the operator to control the delivery of the surface treatment agent while handling the elongated rod; and
   an applicator disposed at the distal end of the elongated rod adjacent the outlet, the applicator engageable with the inner surface of the hollow engine shaft for applying, upon activation of the input device, the predetermined quantity of the surface treatment agent from the supply of the surface treatment agent to the inner surface of the hollow engine shaft.

2. The surface treatment device as defined in claim 1, wherein the input device is configured for delivering the predetermined quantity of the surface treatment agent based on an axial length of the hollow engine shaft, an inner diameter of the hollow engine shaft, and a thickness of the surface treatment agent to be applied to the inner surface of the hollow engine shaft.

3. The surface treatment device as defined in claim 1, wherein the applicator is configured for applying a first portion of the predetermined quantity of the surface treatment agent to a first section of the hollow engine shaft and a second portion of the predetermined quantity of the surface treatment agent to a second section of the hollow engine shaft.

4. The surface treatment device as defined in claim 3, wherein the one or more control buttons include a first button integrated to the handle and operable to activate the delivery of the first predetermined quantity of the surface treatment agent and a second button integrated to the handle and operable to activate the delivery of the second predetermined quantity of the surface treatment agent.

5. The surface treatment device as defined in claim 1, further comprising a fluid pump in the supply of the surface treatment agent, the fluid pump configured to activate for a predetermined duration of time to deliver the predetermined quantity of the surface treatment agent to the applicator.

6. The surface treatment device as defined in claim 1, further comprising a fluid pump in the supply of the surface treatment agent and a flow meter fluidly coupled between the supply of the surface treatment agent and the applicator, the flow meter operable to meter a flow of the surface treatment agent and deactivate the fluid pump upon the predetermined quantity of the surface treatment agent being delivered.

7. The surface treatment device as defined in claim 1, further comprising one or more of a visual indicator and an auditory indicator operable to present a status of the delivery of the predetermined quantity of the surface treatment agent.

8. The surface treatment device as defined in claim 1, wherein the outlet includes one or more nozzles fluidly coupled to the inner passage at the distal end.

9. The surface treatment device as defined in claim 1, wherein the outlet is directly fluidly coupled to the applicator at the distal end for providing the surface treatment agent directly to the applicator.

10. The surface treatment device as defined in claim 1, wherein the applicator is a sponge.

11. The surface treatment device as defined in claim 4, wherein each of the first and second button is operatively connected to a timer for respectively timing first and second surface treatment sequences.

12. The surface treatment device as defined in claim 1, wherein each of the one or more control button is operable to command the delivery of a predetermined quantity of surface treatment agent.

13. The surface treatment device as defined in claim 1, further comprising a timer integrated to the handle.

14. The surface treatment device as defined in claim 1, wherein a display screen is integrated to the handle, the display screen operable to display a status of a delivery procedure of the surface treatment agent.

15. The surface treatment device as defined in claim 1, wherein the display screen is operatively connected to a timer.

16. The surface treatment device as defined in claim 1, wherein the applicator includes a first and a second applicator axially spaced-apart by an axial gap, and wherein the outlet is disposed in the axial gap between the first applicator and the second applicator.

17. The surface treatment device as defined in claim 16, wherein the outlet comprises a plurality of nozzles aimed at the first and second applicators, the nozzles operable to saturate the first and second applicators with the surface treatment agent.

* * * * *